(12) United States Patent  
Arnold et al.

(10) Patent No.: US 9,415,344 B2
(45) Date of Patent: *Aug. 16, 2016

(54) METHOD AND SYSTEM USING A FILTER FOR TREATING EXHAUST GAS HAVING PARTICULATE MATTER

(71) Applicant: Johnson Matthey Public Limited Company, London (GB)

(72) Inventors: Louise Clare Arnold, Melbourn (GB); Robert James Brisley, Duxford (GB); Christopher Gough Morgan, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/564,999

(22) Filed: Dec. 9, 2014

(65) Prior Publication Data

US 2015/0093300 A1  Apr. 2, 2015

Related U.S. Application Data

(60) Division of application No. 13/970,109, filed on Aug. 19, 2013, now Pat. No. 8,919,110, which is a division of application No. 13/222,929, filed on Aug. 31, 2011, now Pat. No. 8,512,657, which is a (Continued)

(30) Foreign Application Priority Data

Feb. 26, 2009 (GB) .................................. 0903262.4
Dec. 24, 2009 (GB) .................................. 0922612.7

(51) Int. Cl.
*F01N 3/021* (2006.01)
*F01N 3/022* (2006.01)

(Continued)

(52) U.S. Cl.
CPC ........ *B01D 53/9409* (2013.01); *B01D 53/9431* (2013.01); *B01D 53/9468* (2013.01); *B01D 53/9477* (2013.01); *B01J 23/464* (2013.01); *B01J 29/06* (2013.01); *B01J 29/061* (2013.01);

(Continued)

(58) Field of Classification Search
CPC .......... F01N 3/021; F01N 3/022; F01N 3/035
See application file for complete search history.

(56) References Cited

U.S. PATENT DOCUMENTS

| 8,512,657 B2 * | 8/2013 | Arnold | B01J 37/0246 423/213.2 |
| 8,919,110 B2 * | 12/2014 | Arnold | B01J 37/0246 423/213.2 |
| 2014/0322113 A1 * | 10/2014 | Blakeman | B01D 53/9431 423/212 |

FOREIGN PATENT DOCUMENTS

| DE | 102009029700 A1 * | 4/2010 | ......... B01D 53/9418 |
| JP | 2007-144371 A * | 6/2007 | ............. B01D 53/94 |
| WO | WO 2008/132452 A2 * | 11/2008 | ............. B01D 53/94 |

*Primary Examiner* — Timothy Vanoy
(74) *Attorney, Agent, or Firm* — Gary D. Mangels

(57) ABSTRACT

A filter for filtering particulate matter (PM) from exhaust gas emitted from a positive ignition engine or a compression ignition engine, which filter comprising a porous substrate having inlet surfaces and outlet surfaces, wherein the inlet surfaces are separated from the outlet surfaces by a porous structure containing pores of a first mean pore size, wherein the porous substrate is coated with a washcoat comprising a plurality of solid particles wherein the porous structure of the washcoated porous substrate contains pores of a second mean pore size, and wherein the second mean pore size is less than the first mean pore size.

11 Claims, 7 Drawing Sheets

Related U.S. Application Data continuation-in-part of application No. 12/712,681, filed on Feb. 25, 2010, now Pat. No. 8,012,439, and a continuation-in-part of application No. 13/203,631, filed as application No. PCT/GB2010/050347 on Feb. 26, 2010, now Pat. No. 8,608,820.

(51) Int. Cl.

| | |
|---|---|
| *F01N 3/035* | (2006.01) |
| *B01D 53/94* | (2006.01) |
| *B01J 37/02* | (2006.01) |
| *B01J 23/46* | (2006.01) |
| *B01J 29/06* | (2006.01) |
| *B01J 29/08* | (2006.01) |
| *B01J 29/12* | (2006.01) |
| *B01J 29/14* | (2006.01) |
| *B01J 29/16* | (2006.01) |
| *B01J 29/40* | (2006.01) |
| *B01J 29/44* | (2006.01) |
| *B01J 29/46* | (2006.01) |
| *B01J 29/50* | (2006.01) |
| *B01J 29/54* | (2006.01) |
| *B01J 29/56* | (2006.01) |
| *B01J 29/70* | (2006.01) |
| *B01J 29/72* | (2006.01) |
| *B01J 29/74* | (2006.01) |
| *B01J 29/76* | (2006.01) |
| *B01J 29/78* | (2006.01) |
| *B01J 35/02* | (2006.01) |
| *B01J 35/04* | (2006.01) |
| *B01J 35/10* | (2006.01) |
| *B01J 37/00* | (2006.01) |
| *F01N 3/20* | (2006.01) |
| *F01N 3/08* | (2006.01) |

(52) U.S. Cl.
CPC .............. *B01J 29/082* (2013.01); *B01J 29/088* (2013.01); *B01J 29/126* (2013.01); *B01J 29/146* (2013.01); *B01J 29/166* (2013.01); *B01J 29/405* (2013.01); *B01J 29/44* (2013.01); *B01J 29/46* (2013.01); *B01J 29/505* (2013.01); *B01J 29/54* (2013.01); *B01J 29/56* (2013.01); *B01J 29/7007* (2013.01); *B01J 29/7057* (2013.01); *B01J 29/7215* (2013.01); *B01J 29/7415* (2013.01); *B01J 29/7615* (2013.01); *B01J 29/7815* (2013.01); *B01J 35/023* (2013.01); *B01J 35/04* (2013.01); *B01J 35/10* (2013.01); *B01J 35/1076* (2013.01); *B01J 37/0036* (2013.01); *B01J 37/0217* (2013.01); *B01J 37/0246* (2013.01); *F01N 3/035* (2013.01); *F01N 3/2066* (2013.01); *B01D 53/9418* (2013.01); *B01D 53/9422* (2013.01); *B01D 2255/2065* (2013.01); *B01D 2255/20738* (2013.01); *B01D 2255/20761* (2013.01); *B01D 2255/50* (2013.01); *B01D 2255/9155* (2013.01); *B01D 2255/92* (2013.01); *B01D 2255/9202* (2013.01); *B01D 2258/012* (2013.01); *B01D 2258/014* (2013.01); *B01D 2275/30* (2013.01); *B01D 2279/30* (2013.01); *F01N 3/0842* (2013.01); *F01N 2310/06* (2013.01); *F01N 2510/06* (2013.01); *Y02T 10/24* (2013.01); *Y10S 55/30* (2013.01)

Table 1 - Matrix showing suitability of coated wall-flow filter defined by mean pore size of filter substrate and three-way catalyst washcoat loading

| Mean pore size of substrate (μm) | Three-Way Catalyst Washcoat Loading (g in$^{-3}$) | | | |
|---|---|---|---|---|
| | 0.4 | 0.8 | 1.6 | 2.4 |
| 38 | Insufficient filtration and activity | Insufficient filtration and activity | Borderline filtration and good activity | Good activity and filtration |
| 20 | Insufficient filtration and activity | Borderline filtration and insufficient activity | Good activity and filtration | Good activity and filtration |
| 13 | Insufficient activity but good filtration | Borderline backpressure and insufficient activity | Increased backpressure but good activity | Increased backpressure but good activity |

FIG. 4

METHOD AND SYSTEM USING A FILTER FOR TREATING EXHAUST GAS HAVING PARTICULATE MATTER

CROSS-REFERENCE TO RELATED APPLICATIONS

This application is a division of U.S. patent application Ser. No. 13/970,109, now U.S. Pat. No. 8,919,110, filed Aug. 19, 2013, which is a division of U.S. patent application Ser. No. 13/222,929, now U.S. Pat. No. 8,512,657, filed Aug. 31, 2011, which is: (a) a continuation-in-part of U.S. patent application Ser. No. 12/712,681, now U.S. Pat. No. 8,012,439, filed on Feb. 25, 2010, which claims priority to GB Patent Application Nos. 0903262.4, filed on Feb. 26, 2009, and 0922612.7, filed on Dec. 24, 2009, and (b) is a continuation-in-part of U.S. patent application Ser. No. 13/203,631, now U.S. Pat. No. 8,608,820, filed on Aug. 26, 2011, as the national stage application of International Application No. PCT/GB2010/050347, filed on Feb. 26, 2010, which claims priority to GB Patent Application Nos. 0903262.4, filed on Feb. 26, 2009, and 0922612.7, filed on Dec. 24, 2009, all of which are incorporated herein by reference in their entireties.

FIELD OF THE INVENTION

The present invention relates to a filter for use in treating particulate matter (PM) in exhaust gas derived from any combustion process, such as from a compression ignition engine or from a positive ignition engine. In an embodiment, the filter is used to treat PM in exhaust gas derived from any combustion process where it is not possible to remove PM from the exhaust gas by build-up of PM (so-called "cake filtration") or by a combination of depth filtration and cake filtration. The combustion process is typically that of a vehicular engine. In particular, an embodiment of the invention relates to a filter for use in treating PM derived from a vehicular positive ignition engine, particularly stoichiometrically operated positive ignition engines but also lean-burn positive ignition engines. Another embodiment of the invention relates to a filter for use in treating PM and oxides of nitrogen derived from a compression ignition engine.

BACKGROUND OF THE INVENTION

Positive ignition engines cause combustion of a hydrocarbon and air mixture using spark ignition. Contrastingly, compression ignition engines cause combustion of a hydrocarbon by injecting the hydrocarbon into compressed air and can be fuelled by diesel fuel, biodiesel fuel, blends of diesel and biodiesel fuels and compressed natural gas. Positive ignition engines can be fuelled by gasoline fuel, gasoline fuel blended with oxygenates including methanol and/or ethanol, liquid petroleum gas or compressed natural gas.

Ambient PM is divided by most authors into the following categories based on their aerodynamic diameter (the aerodynamic diameter is defined as the diameter of a 1 g/cm$^3$ density sphere of the same settling velocity in air as the measured particle):
  (i) PM-10—particles of an aerodynamic diameter of less than 10 μm;
  (ii) Fine particles of diameters below 2.5 μm (PM-2.5);
  (iii) Ultrafine particles of diameters below 0.1 μm (or 100 nm); and
  (iv) Nanoparticles, characterised by diameters of less than 50 nm.

Since the mid-1990's, particle size distributions of particulates exhausted from internal combustion engines have received increasing attention due to possible adverse health effects of fine and ultrafine particles. Concentrations of PM-10 particulates in ambient air are regulated by law in the USA. A new, additional ambient air quality standard for PM-2.5 was introduced in the USA in 1997 as a result of health studies that indicated a strong correlation between human mortality and the concentration of fine particles below 2.5 μm.

Interest has now shifted towards nanoparticles generated by diesel and gasoline engines because they are understood to penetrate more deeply into human lungs than particulates of greater size and consequently they are believed to be more harmful than larger particles, extrapolated from the findings of studies into particulates in the 2.5-10.0 μm range.

Size distributions of diesel particulates have a well-established bimodal character that correspond to the particle nucleation and agglomeration mechanisms, with the corresponding particle types referred to as the nuclei mode and the accumulation mode respectively (see FIG. 1). As can be seen from FIG. 1, in the nuclei mode, diesel PM is composed of numerous small particles holding very little mass. Nearly all diesel particulates have sizes of significantly less than 1 μm, i.e. they comprise a mixture of fine, i.e. falling under the 1997 US law, ultrafine and nanoparticles.

Nuclei mode particles are believed to be composed mostly of volatile condensates (hydrocarbons, sulfuric acid, nitric acid etc.) and contain little solid material, such as ash and carbon. Accumulation mode particles are understood to comprise solids (carbon, metallic ash etc.) intermixed with condensates and adsorbed material (heavy hydrocarbons, sulfur species, nitrogen oxide derivatives etc.) Coarse mode particles are not believed to be generated in the diesel combustion process and may be formed through mechanisms such as deposition and subsequent re-entrainment of particulate material from the walls of an engine cylinder, exhaust system, or the particulate sampling system. The relationship between these modes is shown in FIG. 1.

The composition of nucleating particles may change with engine operating conditions, environmental condition (particularly temperature and humidity), dilution and sampling system conditions. Laboratory work and theory have shown that most of the nuclei mode formation and growth occur in the low dilution ratio range. In this range, gas to particle conversion of volatile particle precursors, like heavy hydrocarbons and sulfuric acid, leads to simultaneous nucleation and growth of the nuclei mode and adsorption onto existing particles in the accumulation mode. Laboratory tests (see e.g. SAE 980525 and SAE 2001-01-0201) have shown that nuclei mode formation increases strongly with decreasing air dilution temperature but there is conflicting evidence on whether humidity has an influence.

Generally, low temperature, low dilution ratios, high humidity and long residence times favour nanoparticles formation and growth. Studies have shown that nanoparticles consist mainly of volatile material like heavy hydrocarbons and sulfuric acid with evidence of solid fraction only at very high loads.

Contrastingly, engine-out size distributions of gasoline particulates in steady state operation show a unimodal distribution with a peak of about 60-80 nm (see e.g. FIG. 4 in SAE 1999-01-3530). By comparison with diesel size distribution, gasoline PM is predominantly ultrafine with negligible accumulation and coarse mode.

Particulate collection of diesel particulates in a diesel particulate filter is based on the principle of separating gas-borne particulates from the gas phase using a porous barrier. Diesel filters can be defined as deep-bed filters and/or surface-type filters. In deep-bed filters, the mean pore size of filter media is bigger than the mean diameter of collected particles. The particles are deposited on the media through a combination of depth filtration mechanisms, including diffusional deposition (Brownian motion), inertial deposition (impaction) and flow-line interception (Brownian motion or inertia).

In surface-type filters, the pore diameter of the filter media is less than the diameter of the PM, so PM is separated by sieving. Separation is done by a build-up of collected diesel PM itself, which build-up is commonly referred to as "filtration cake" and the process as "cake filtration".

It is understood that diesel particulate filters, such as ceramic wallflow monoliths, may work through a combination of depth and surface filtration: a filtration cake develops at higher soot loads when the depth filtration capacity is saturated and a particulate layer starts covering the filtration surface. Depth filtration is characterized by somewhat lower filtration efficiency and lower pressure drop than the cake filtration.

WO 03/011437 discloses a gasoline engine having an exhaust system comprising means for trapping PM from the exhaust gas and a catalyst for catalysing the oxidation of the PM by carbon dioxide and/or water in the exhaust gas, which catalyst comprising a supported alkali metal. The means for trapping PM is suitable for trapping PM of particle range 10-100 nm, and can be a wallflow filter made from a ceramic material of appropriate pore size such as cordierite coated with the catalyst, a metal oxide foam supporting the catalyst, a wire mesh, a diesel wallflow filter designed for diesel applications, an electrophoretic trap or a thermophoretic trap (see e.g. GB-A-2350804).

WO 2008/136232 A1 discloses a honeycomb filter having a cell wall composed of a porous cell wall base material and, provided on its inflow side only or on its inflow and outflow sides, a surface layer and satisfying the following requirements (1) to (5) is used as a diesel particulate filter: (1) the peak pore diameter of the surface layer is identical with or smaller than the average pore diameter of the cell wall base material, and the porosity of the surface layer is larger than that of the cell wall base material; (2) with respect to the surface layer, the peak pore diameter is from 0.3 to less than 20 μm, and the porosity is from 60 to less than 95% (measured by mercury penetration method); (3) the thickness (L1) of the surface layer is from 0.5 to less than 30% of the thickness (L2) of the cell wall; (4) the mass of the surface layer per filtration area is from 0.01 to less than 6 mg/cm$^2$; and (5) with respect to the cell wall base material, the average pore diameter is from 10 to less than 60 μm, and the porosity is from 40 to less than 65%. See also SAE paper no. 2009-01-0292.

Other techniques suggested in the art for separating gasoline PM from the gas phase include vortex recovery.

In the United States, no similar emission standards have been set. However, the State of California Air Resources Board (CARB) recently published a paper entitled "Preliminary Discussion Paper—Amendments to California's Low-Emission Vehicle [LEV] Regulations for Criteria Pollutants—LEV III" (release date 8 Feb. 2010) in which a new PM standard of between 2 and 4 mg PM/mile (1.25-2.50 mg PM/km (currently 10 mg PM/mile (6.25 mg PM/km))) is proposed, the paper commenting that: "Staff has received input from a number of manufacturers suggesting that a standard of 3 mg PM/mile (1.88 mg PM/km) can be met for gasoline direct injection engines without requiring the use of particulate filters." Additionally, the paper states that since the PM mass and count emissions appear to be correlated: "Although a mandatory number standard is not being considered at this time, an optional PM number standard of about $10^{12}$ particles/mile [$6.25^{11}$ particles/km] is being considered (which could be chosen by manufacturers instead of the PM mass standard)". However, since neither the PM standard nor the PM number standard has been set by CARB yet, it is too soon to know whether particulate filtration will be necessary for the Californian or US vehicle market generally. It is nevertheless possible that certain vehicle manufacturers will choose filters in order to provide a margin of safety on any positive ignition engine design options selected to meet whatever standards are eventually set.

The new Euro 6 emission standard presents a number of challenging design problems for meeting gasoline emission standards. In particular, how to design a filter, or an exhaust system including a filter, for reducing the number of PM gasoline (positive ignition) emissions, yet at the same time meeting the emission standards for non-PM pollutants such as one or more of oxides of nitrogen ($NO_x$), carbon monoxide (CO) and unburned hydrocarbons (HC), all at an acceptable back pressure, e.g. as measured by maximum on-cycle backpressure on the EU drive cycle.

It is envisaged that a minimum of particle reduction for a three-way catalysed particulate filter to meet the Euro 6 PM number standard relative to an equivalent flowthrough catalyst is ≥50%. Additionally, while some backpressure increase for a three-way catalysed wallflow filter relative to an equivalent flowthrough catalyst is inevitable, in our experience peak backpressure over the MVEG-B drive cycle (average over three tests from "fresh") for a majority of passenger vehicles should be limited to <200 mbar, such as <180 mbar, <150 mbar and preferably <120 mbar e.g. <100 mbar.

PM generated by positive ignition engines has a significantly higher proportion of ultrafine, with negligible accumulation and coarse mode compared with that produced by diesel (compression ignition) engines, and this presents challenges to removing it from positive ignition engine exhaust gas in order to prevent its emission to atmosphere. In particular, since a majority of PM derived from a positive ignition engine is relatively small compared with the size distribution for diesel PM, it is not practically possible to use a filter substrate that promotes positive ignition PM surface-type cake filtration because the relatively low mean pore size of the filter substrate that would be required would produce impractically high backpressure in the system.

Furthermore, generally it is not possible to use a conventional wallflow filter, designed for trapping diesel PM, for promoting surface-type filtration of PM from a positive ignition engine in order to meet relevant emission standards because there is generally less PM in positive ignition exhaust gas, so formation of a soot cake is less likely; and positive ignition exhaust gas temperatures are generally higher, which can lead to faster removal of PM by oxidation, thus preventing increased PM removal by cake filtration. Depth filtration of positive ignition PM in a conventional diesel wallflow filter is also difficult because the PM is significantly smaller than the pore size of the filter medium. Hence, in normal operation, an uncoated conventional diesel wallflow filter will have a lower filtration efficiency when used with a positive ignition engine than a compression ignition engine.

Another difficulty is combining filtration efficiency with a washcoat loading, e.g. of catalyst for meeting emission standards for non-PM pollutants, at acceptable backpressures. Diesel wallflow particulate filters in commercially available vehicles today have a mean pore size of about 13 μm. However, we have found that washcoating a filter of this type at a sufficient catalyst loading such as is described in US 2006/

0133969 to achieve required gasoline (positive ignition) emission standards can cause unacceptable backpressure.

In order to reduce filter backpressure it is possible to reduce the length of the substrate. However, there is a finite level below which the backpressure increases as the filter length is reduced. Suitable filter lengths for filters according to embodiments of the present invention are from 2-12 inches long, preferably 3-6 inches long. Cross sections can be circular and in our development work we have used 4.66 and 5.66 inch diameter filters. However, cross-section can also be dictated by space on a vehicle into which the filter is required to fit. So for filters located in the so-called close coupled position, e.g. within 50 cm of the engine exhaust manifold where space is at a premium, elliptical or oval filter cross sections can be contemplated. As would be expected, backpressure also increases with washcoat loading and soot loading.

There have been a number of recent efforts to combine three-way catalysts with filters for meeting the Euro 6 emission standards.

US 2009/0193796 discloses a three-way conversion catalyst coated onto a particulate trap. The Examples disclose e.g. a soot filter having a catalytic material prepared using two coats: an inlet coat and an outlet coat. The mean pore size of the soot filter substrate used is not mentioned. The inlet coat contains alumina, an oxygen storage component (OSC) and rhodium all at a total loading of 0.17 g in$^{-3}$; the outlet coat includes alumina, an OSC and palladium, all at a total loading of 0.42 g in$^{-3}$. However, we believe that the three-way catalyst washcoat loading of <0.5 g in$^{-3}$ provides insufficient three-way activity to meet the required emission standards alone, i.e. the claimed filter appears to be designed for inclusion in a system for location downstream of a three-way catalyst comprising a flowthrough substrate monolith.

WO 2009/043390 discloses a catalytically active particulate filter comprising a filter element and a catalytically active coating composed of two layers. The first layer is in contact with the in-flowing exhaust gas while the second layer is in contact with the out-flowing exhaust gas. Both layers contain aluminium oxide. The first layer contains palladium, the second layer contains an oxygen-storing mixed cerium/zirconium oxide in addition to rhodium. In Examples, a wallflow filter substrate of unspecified mean pore size is coated with a first layer at a loading of approximately 31 g/l and a second layer at a loading of approximately 30 g/l. That is, the washcoat loading is less than 1.00 g in$^{-3}$. For a majority of vehicle applications, this coated filter is unlikely to be able to meet the required emission standards alone.

A difficulty in coating a filter with a catalyst composition is to balance a desired catalytic activity, which generally increases with washcoat loading, with the backpressure that is caused by the filter in use (increased washcoat loading generally increases backpressure) and filtration efficiency (backpressure can be reduced by adopting wider mean pore size and higher porosity substrates at the expense of filtration efficiency).

SUMMARY OF THE INVENTION

According to an embodiment of the invention, we have now discovered, very surprisingly, that it is possible to adapt a relatively porous particulate filter—such as a particulate filter adapted for a diesel application—so that it can be used to trap e.g. ultrafine positive ignition PM at an acceptable pressure drop and backpressure. In particular, our inventors have determined that a washcoat that hinders access of the PM to a porous structure of a filter substrate can beneficially promote surface filtration substantially at the expense of depth filtration to the extent that cake filtration of PM derived from a positive ignition engine is promoted or enhanced.

Early indications suggest that positive ignition PM combusts in oxygen at lower temperatures than diesel PM. Investigations are continuing, but the invention makes use of this observation by providing means for trapping the positive ignition PM for combustion in oxygen.

According to one aspect, the invention provides a filter for filtering particulate matter (PM) from exhaust gas emitted from an engine, such as a compression ignition engine or a positive ignition engine, e.g. a vehicular positive ignition engine such as a stoichiometrically-operated positive ignition engine or a lean burn positive ignition engine, which filter comprising a porous substrate having inlet surfaces and outlet surfaces, wherein the inlet surfaces are separated from the outlet surfaces by a porous structure containing pores, e.g. surface pores, of a first mean pore size, wherein the porous substrate is coated with a washcoat comprising a plurality of solid particles wherein the porous structure of the washcoated porous substrate contains pores of a second mean pore size, and wherein the second mean pore size is less than the first mean pore size.

BRIEF DESCRIPTION OF THE DRAWINGS

In order that the invention may be more fully understood, reference is made to the accompanying drawings wherein:

FIG. 4 is a Table setting out a matrix of wallflow filter substrate pore size vs. washcoat loading indicating the suitability of the coated wallflow filter for use in a vehicular gasoline exhaust gas aftertreatment system;

DETAILED DESCRIPTION OF THE INVENTION

Figure 1:
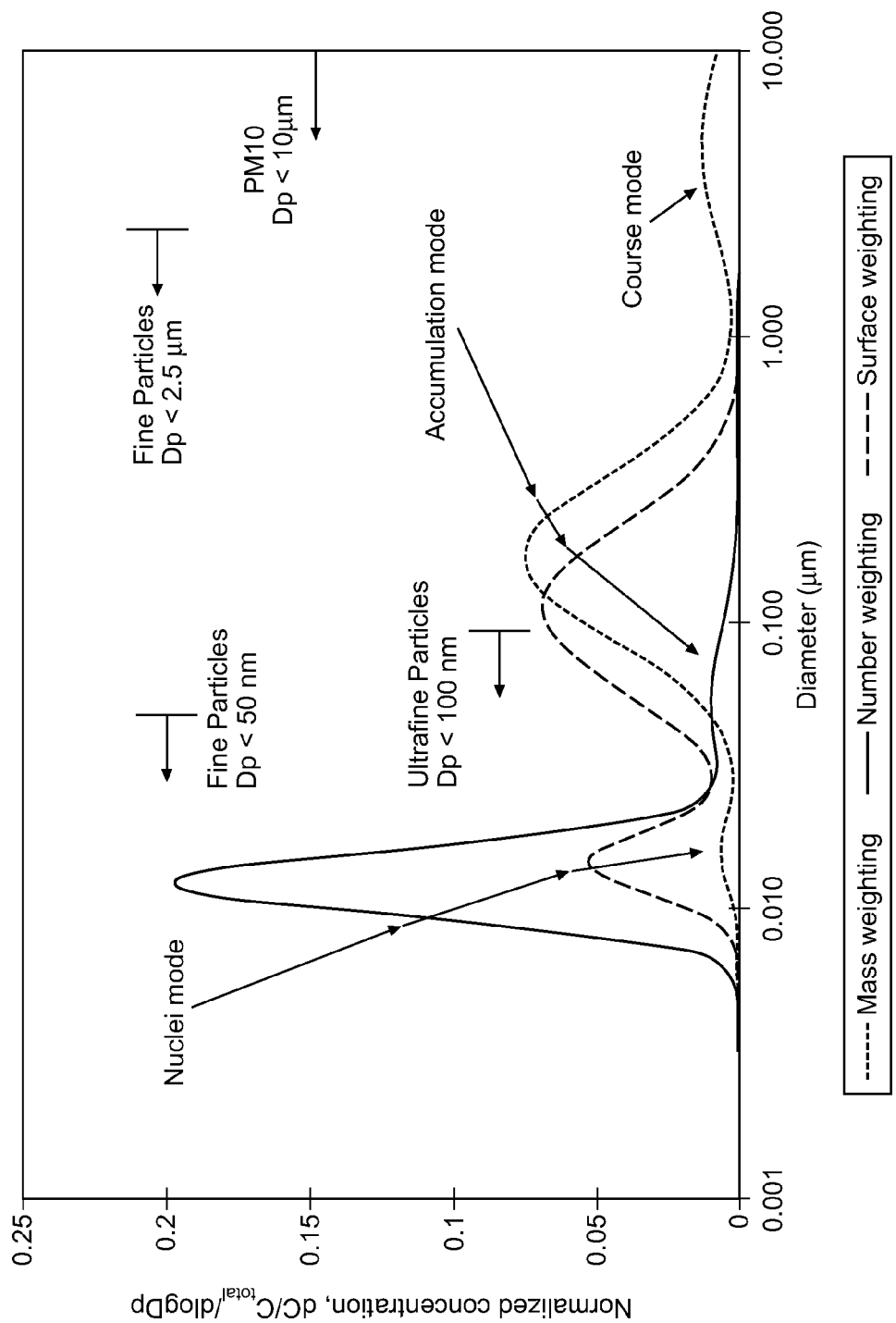
FIG. 1 is a graph showing the size distributions of PM in the exhaust gas of a diesel engine. For comparison, a gasoline size distribution is shown at FIG. 4 of SAE 1999-01-3530.

Early indications are that at least some embodiments of the present invention directed to use with a positive ignition engine are capable of reducing positive ignition engine particle number emissions by >30% such as >50% e.g. >80% or even >90% at acceptable backpressure.

Mean pore size can be determined by mercury porosimetry.

It will be understood that the benefit of the invention is substantially independent of the porosity of the substrate. Porosity is a measure of the percentage of void space in a porous substrate and is related to backpressure in an exhaust system: generally, the lower the porosity, the higher the backpressure. However, the porosity of filters for use in the present embodiments of the invention are typically >40% or >50% and porosities of 45-75% such as 50-65% or 55-60% can be used with advantage. The mean pore size of the washcoated porous substrate is important for filtration. So, it is possible to have a porous substrate of relatively high porosity that is a poor filter because the mean pore size is also relatively high.

The porous substrate can be a metal, such as a sintered metal, or a ceramic, e.g. silicon carbide, cordierite, aluminium nitride, silicon nitride, aluminium titanate, alumina, cordierite, mullite e.g., acicular mullite (see e.g. WO 01/16050), pollucite, a thermet such as $Al_2O_3/Fe$, $Al_2O_3/N_1$ or $B_4C/Fe$, or composites comprising segments of any two or more thereof. In a preferred embodiment, the filter is a wall-flow filter comprising a ceramic porous filter substrate having a plurality of inlet channels and a plurality of outlet channels, wherein each inlet channel and each outlet channel is defined in part by a ceramic wall of porous structure, wherein each inlet channel is separated from an outlet channel by a ceramic wall of porous structure. This filter arrangement is also disclosed in SAE 810114, and reference can be made to this document for further details. Alternatively, the filter can be a foam, or a so-called partial filter, such as those disclosed in EP 1057519 or WO 01/080978.

Reasons motivating the coating of a wallflow filter for a diesel application are typically different from that of embodiments of the present invention directed to use with a positive ignition engine. In diesel applications, a washcoat is employed to introduce catalytic components to the filter substrate, e.g. catalysts for oxidising NO to $NO_2$, yet a significant problem is to avoid backpressure issues as soot is accumulated. Accordingly, a balance is struck between the desired catalytic activity and acceptable backpressure. Contrastingly, a primary motivating factor for washcoating a porous substrate for use of embodiments of the present invention directed to use with a positive ignition engine is to achieve both a desired filtration efficiency and catalytic activity.

In one embodiment, the first mean pore size e.g. of surface pores of the porous structure of the porous filter substrate is from 8 to 45 μm, for example 8 to 25 μm, 10 to 20 μm or 10 to 15 μm. In particular embodiments, the first mean pore size is >18 μm such as from 15 to 45 μm, 20 to 45 μm e.g. 20 to 30 μm, or 25 to 45 μm.

In embodiments, the filter has a washcoat loading of >0.25 g in$^{-3}$, such as >0.5 g in$^{-3}$ or ≥0.80 g in$^{-3}$, e.g. 0.80 to 3.00 g in$^{-3}$. In preferred embodiments, the washcoat loading is >1.00 g in$^{-3}$ such as ≥1.2 g in$^{-3}$, >1.5 g in$^{-3}$, >1.6 g in$^{-3}$ or >2.00 g in$^{-3}$ or for example 1.6 to 2.4 g in$^{-3}$. In particular combinations of filter mean pore size and washcoat loading the filter combines a desirable level of particulate filtration and catalytic activity at acceptable backpressure.

Figure 2A:
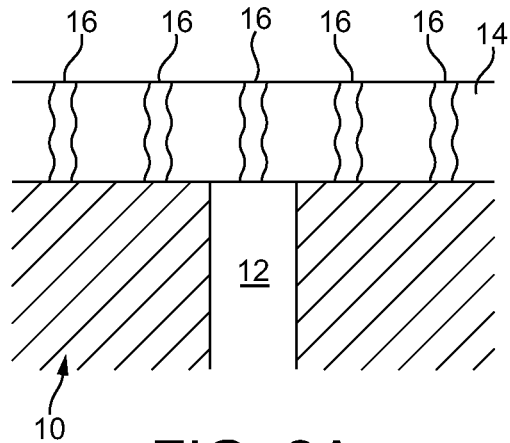
FIGS. 2A-C show schematic drawings of three embodiments of washcoated porous filter substrates according to the invention.

In a first, preferred embodiment, the filter comprises a surface washcoat, wherein a washcoat layer substantially covers surface pores of the porous structure and the pores of the washcoated porous substrate are defined in part by spaces between the particles (interparticle pores) in the washcoat. That is, substantially no washcoat enters the porous structure of the porous substrate. Methods of making surface coated porous filter substrates include introducing a polymer, e.g. poly vinyl alcohol (PVA), into the porous structure, applying a washcoat to the porous filter substrate including the polymer and drying, then calcining the coated substrate to burn out the polymer. A schematic representation of the first embodiment is shown in FIG. 2A.

Methods of coating porous filter substrates are known to the skilled person and include, without limitation, the method disclosed in WO 99/47260, i.e. a method of coating a monolithic support, comprising the steps of (a) locating a containment means on top of a support, (b) dosing a pre-determined quantity of a liquid component into said containment means, either in the order (a) then (b) or (b) then (a), and (c) by applying pressure or vacuum, drawing said liquid component into at least a portion of the support, and retaining substantially all of said quantity within the support. Such process steps can be repeated from another end of the monolithic support following drying of the first coating with optional firing/calcination.

In this first embodiment, an average interparticle pore size of the porous washcoat is 5.0 nm to 5.0 μm, such as 0.1-1.0 μm.

A D90 of solid washcoat particles in this first, surface coating embodiment can be greater than the mean pore size of the porous filter substrate and can be in the range 10 to 40 μm, such as 15 to 30 μm or 12 to 25 μm. "D90" as used herein defines the particle size distribution in a washcoat wherein 90% of the particles present have a diameter within the range specified. Alternatively, in embodiments, the mean size of the solid washcoat particles is in the range 1 to 20 μm. It will be understood that the broader the range of particle sizes in the washcoat, the more likely that washcoat may enter the porous structure of the porous substrate. The term "substantially no washcoat enters the porous structure of the substrate" should therefore be interpreted accordingly.

Figure 2B:
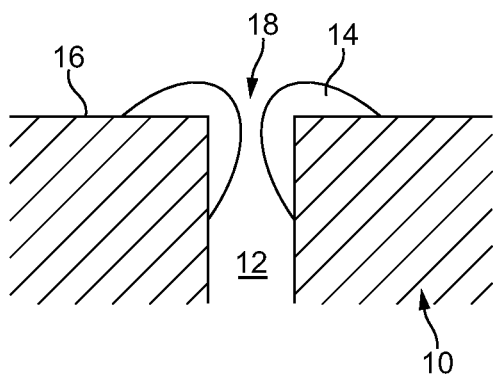

According to a second embodiment, the washcoat can be coated on inlet and/or outlet surfaces and also within the porous structure of the porous substrate. We believe that a surface coating around a pore opening at the inlet and/or outlet surfaces, thereby narrowing the e.g. surface pore size of a bare filter substrate, promotes interaction of the gas phase including PM without substantially restricting the pore volume, so not giving rise to significant increases in back pressure. That is, the pores at a surface of the porous structure comprise a pore opening and the washcoat causes a narrowing of substantially all the pore openings. A schematic representation of the second embodiment is shown in FIG. 2B.

Methods of making a filter according to the second embodiment can involve appropriate formulation of the washcoat known to the person skilled in the art including adjusting viscosity and surface wetting characteristics and application of an appropriate vacuum following coating of the porous substrate (see also WO 99/47260).

In the first and second embodiments, wherein at least part of the washcoat is coated on inlet and/or outlet surfaces of the porous substrate, the washcoat can be coated on the inlet surfaces, the outlet surfaces or on both the inlet and the outlet surfaces. Additionally either one or both of the inlet and outlet surfaces can include a plurality of washcoat layers, wherein each washcoat layer within the plurality of layers can be the same or different, e.g. the mean pore size in a first layer can be different from that of a second layer. In embodiments, washcoat intended for coating on outlet surfaces is not necessarily the same as for inlet surfaces.

Where both inlet and outlet surfaces are coated, the washcoat formulations can be the same or different. Where both the inlet and the outlet surfaces are washcoated, the mean pore size of washcoat on the inlet surfaces can be different from the mean pore size of washcoat on the outlet surfaces. For example, the mean pore size of washcoat on the inlet surfaces can be less than the mean pore size of washcoat on the outlet surfaces. In the latter case, a mean pore size of washcoat on the outlet surfaces can be greater than a mean pore size of the porous substrate.

Whilst it is possible for the mean pore size of a washcoat applied to inlet surfaces to be greater than the mean pore size of the porous substrate, it is advantageous to have washcoat having smaller pores than the porous substrate in washcoat on inlet surfaces to prevent or reduce any combustion ash or debris entering the porous structure.

Figure 2C:
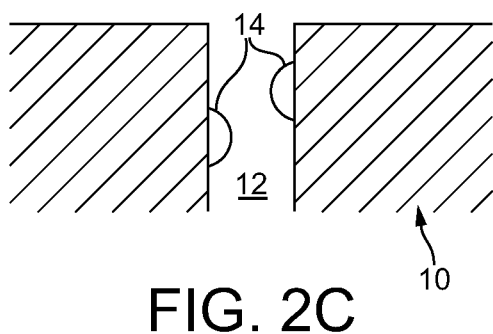

According to a third embodiment, the washcoat sits substantially within, i.e. permeates, the porous structure of the porous substrate. A schematic representation of this third embodiment is shown in FIG. 2C. Methods of making a filter according to the third embodiment include the appropriate formulation of the washcoat known to the person skilled in the art including viscosity adjustment, selection of low wetting characteristics and application of an appropriate vacuum following washcoating of the porous substrate (see also WO 99/47260). Alternatively, the porous substrate can be soaked in an appropriate solution of salts and the resulting product dried and calcined.

EP 1663458 discloses a SCR filter, wherein the filter is a wallflow monolith and wherein an SCR catalyst composition permeates walls of the wallflow monolith. The specification discloses generally that the walls of the wallflow filter can contain thereon or therein (i.e. not both) one or more catalytic materials. According to the disclosure, "permeate", when used to describe the dispersion of a catalyst slurry on the wallflow monolith substrate, means the catalyst composition is dispersed throughout the wall of the substrate.

In the second and third embodiments, wherein at least part of the washcoat is in the porous structure, a size, e.g. a mean size, of the solid washcoat particles can be less than the mean pore size of the porous filter substrate for example in the range 0.1 to 20 μm, such as 1 to 18 μm, 1 to 16 μm, 2 to 15 μm or 3 to 12 μm. In particular embodiments, the abovementioned size of the solid washcoat particles is a D90 instead of a mean size.

In further particular embodiments, the surface porosity of the washcoat is increased by including voids therein. Exhaust gas catalysts having such features are disclosed, e.g. in our WO 2006/040842 and WO 2007/116881.

By "voids" in the washcoat layer herein, we mean that a space exists in the layer defined by solid washcoat material. Voids can include any vacancy, fine pore, tunnel-state (cylinder, prismatic column), slit etc., and can be introduced by including in a washcoat composition for coating on the filter substrate a material that is combusted during calcination of a coated filter substrate, e.g. chopped cotton or materials to give rise to pores made by formation of gas on decomposition or combustion. Where voids are present, voids are different from, and therefore should not be counted towards determination of, the average interparticle pore size of the porous washcoat.

The average void ratio of the washcoat can be from 5-80%, whereas the average diameter of the voids can be from 0.2 to 500 μm, such as 10 to 250 μm.

The washcoat for use in the filter of the invention is preferably a catalytic washcoat, and in embodiments is selected from the group consisting of a hydrocarbon trap, a three-way catalyst (TWC), a $NO_x$ absorber, an oxidation catalyst, a selective catalytic reduction (SCR) catalyst, a lean $NO_x$ catalyst and combinations of any two or more thereof. For example, in preferred embodiments, inlet surfaces are coated with a TWC washcoat or $NO_x$ absorber composition and the outlet surfaces are coated with SCR washcoat. In this arrangement, intermittent rich running of the engine, e.g. to regenerate the $NO_x$ absorption capacity of the $NO_x$ absorber, can generate ammonia in situ on the TWC or $NO_x$ absorber for use in reducing $NO_x$ on SCR catalyst on the outlet surfaces. Similarly, an oxidation catalyst can include hydrocarbon trap functionality. In one embodiment, the inlet surfaces are not coated with SCR catalyst.

The catalytic washcoat, such as the TWC, $NO_x$ absorber, oxidation catalyst, hydrocarbon trap and the lean $NO_x$ catalyst, can contain one or more platinum group metals, particularly those selected from the group consisting of platinum, palladium and rhodium.

TWCs are intended to catalyse three simultaneous reactions: (i) oxidation of carbon monoxide to carbon dioxide, (ii) oxidation of unburned hydrocarbons to carbon dioxide and water; and (iii) reduction of nitrogen oxides to nitrogen and oxygen. These three reactions occur most efficiently when the TWC receives exhaust from an engine running at or about the stoichiometric point. As is well known in the art, the quantity of carbon monoxide (CO), unburned hydrocarbons (HC) and nitrogen oxides ($NO_x$) emitted when gasoline fuel is combusted in a positive ignition (e.g. spark-ignited) internal combustion engine is influenced predominantly by the air-to-fuel ratio in the combustion cylinder. An exhaust gas having a stoichiometrically balanced composition is one in which the concentrations of oxidising gases ($NO_x$ and $O_2$) and reducing gases (HC and CO) are substantially matched. The air-to-fuel ratio that produces the stoichiometrically balanced exhaust gas composition is typically given as 14.7:1.

Theoretically, it should be possible to achieve complete conversion of $O_2$, $NO_x$, CO and HC in a stoichiometrically balanced exhaust gas composition to $CO_2$, $H_2O$ and $N_2$ and this is the duty of the three-way catalyst. Ideally, therefore, the engine should be operated in such a way that the air-to-fuel ratio of the combustion mixture produces the stoichiometrically balanced exhaust gas composition.

A way of defining the compositional balance between oxidising gases and reducing gases of the exhaust gas is the lambda (λ) value of the exhaust gas, which can be defined according to equation (1) as:

Actual engine air-to-fuel ratio/Stoichiometric engine air-to-fuel ratio, (1)

wherein a lambda value of 1 represents a stoichiometrically balanced (or stoichiometric) exhaust gas composition, wherein a lambda value of >1 represents an excess of $O_2$ and $NO_x$ and the composition is described as "lean" and wherein a lambda value of <1 represents an excess of HC and CO and the composition is described as "rich". It is also common in the art to refer to the air-to-fuel ratio at which the engine operates as "stoichiometric", "lean" or "rich", depending on the exhaust gas composition which the air-to-fuel ratio generates: hence stoichiometrically-operated gasoline engine or lean-burn gasoline engine.

It should be appreciated that the reduction of $NO_x$ to $N_2$ using a TWC is less efficient when the exhaust gas composition is lean of stoichiometric. Equally, the TWC is less able to oxidise CO and HC when the exhaust gas composition is rich. The challenge, therefore, is to maintain the composition of the exhaust gas flowing into the TWC at as close to the stoichiometric composition as possible.

Of course, when the engine is in steady state it is relatively easy to ensure that the air-to-fuel ratio is stoichiometric. However, when the engine is used to propel a vehicle, the quantity of fuel required changes transiently depending upon the load demand placed on the engine by the driver. This makes controlling the air-to-fuel ratio so that a stoichiometric exhaust gas is generated for three-way conversion particularly difficult. In practice, the air-to-fuel ratio is controlled by an engine control unit, which receives information about the exhaust gas composition from an exhaust gas oxygen (EGO) (or lambda) sensor: a so-called closed loop feedback system. A feature of such a system is that the air-to-fuel ratio oscillates (or perturbates) between slightly rich of the stoichiometric (or control set) point and slightly lean, because there is a time lag associated with adjusting air-to-fuel ratio. This perturbation is characterised by the amplitude of the air-to-fuel ratio and the response frequency (Hz).

The active components in a typical TWC comprise one or both of platinum and palladium in combination with rhodium, or even palladium only (no rhodium), supported on a high surface area oxide, and an oxygen storage component.

When the exhaust gas composition is slightly rich of the set point, there is a need for a small amount of oxygen to consume the unreacted CO and HC, i.e. to make the reaction more stoichiometric. Conversely, when the exhaust gas goes slightly lean, the excess oxygen needs to be consumed. This was achieved by the development of the oxygen storage component that liberates or absorbs oxygen during the perturbations. The most commonly used oxygen storage component (OSC) in modern TWCs is cerium oxide ($CeO_2$) or a mixed oxide containing cerium, e.g. a Ce/Zr mixed oxide.

$NO_x$ absorber catalysts (NACs) are known e.g. from U.S. Pat. No. 5,473,887 and are designed to adsorb nitrogen oxides ($NO_x$) from lean exhaust gas (lambda>1) and to desorb the $NO_x$ when the oxygen concentration in the exhaust gas is decreased. Desorbed $NO_x$ may be reduced to $N_2$ with a suitable reductant, e.g. gasoline fuel, promoted by a catalyst component, such as rhodium, of the NAC itself or located downstream of the NAC. In practice, control of oxygen concentration can be adjusted to a desired redox composition intermittently in response to a calculated remaining $NO_x$ adsorption capacity of the NAC, e.g. richer than normal engine running operation (but still lean of stoichiometric or lambda=1 composition), stoichiometric or rich of stoichiometric (lambda<1). The oxygen concentration can be adjusted by a number of means, e.g. throttling, injection of additional hydrocarbon fuel into an engine cylinder such as during the exhaust stroke or injecting hydrocarbon fuel directly into exhaust gas downstream of an engine manifold.

A typical NAC formulation includes a catalytic oxidation component, such as platinum, a significant quantity, i.e. substantially more than is required for use as a promoter such as a promoter in a TWC, of a $NO_x$-storage component, such as barium, and a reduction catalyst, e.g. rhodium. One mechanism commonly given for $NO_x$-storage from a lean exhaust gas for this formulation is:

$$NO + \tfrac{1}{2}O_2 \rightarrow NO_2 \quad (2); \text{ and}$$

$$BaO + NO_2 + \tfrac{1}{2}O_2 \rightarrow Ba(NO_3)_2 \quad (3),$$

wherein in reaction (2), the nitric oxide reacts with oxygen on active oxidation sites on the platinum to form $NO_2$. Reaction (3) involves adsorption of the $NO_2$ by the storage material in the form of an inorganic nitrate.

At lower oxygen concentrations and/or at elevated temperatures, the nitrate species become thermodynamically unstable and decompose, producing NO or $NO_2$ according to reaction (4) below. In the presence of a suitable reductant, these nitrogen oxides are subsequently reduced by carbon monoxide, hydrogen and hydrocarbons to $N_2$, which can take place over the reduction catalyst (see reaction (5)).

$$Ba(NO_3)_2 \rightarrow BaO + 2NO + 3/2 O_2 \text{ or } Ba(NO_3)_2 \rightarrow BaO + 2NO_2 + \tfrac{1}{2}O_2 \quad (4); \text{ and}$$

$$NO + CO \rightarrow \tfrac{1}{2}N_2 + CO_2 \quad (5);$$

(Other reactions include $Ba(NO_3)_2 + 8H_2 \rightarrow BaO + 2NH_3 + 5H_2O$ followed by $NH_3 + NO_x \rightarrow N_2 + yH_2O$ or $2NH_3 + 2O_2 + CO \rightarrow N_2 + 3H_2O + CO_2$ etc.).

In the reactions of (2)-(5) above, the reactive barium species is given as the oxide. However, it is understood that in the presence of air most of the barium is in the form of the carbonate or possibly the hydroxide. The skilled person can adapt the above reaction schemes accordingly for species of barium other than the oxide and sequence of catalytic coatings in the exhaust stream.

Oxidation catalysts promote the oxidation of carbon monoxide to carbon dioxide and unburned hydrocarbons to carbon dioxide to water. Typical oxidation catalysts include platinum and/or palladium on a high surface area support.

Hydrocarbon traps typically include molecular sieves and may also be catalysed e.g. with a platinum group metal such as platinum or a combination of both platinum and palladium.

SCR catalysts can be selected from the group consisting of at least one of Cu, Hf, La, Au, In, V, lanthanides and Group VIII transition metals, such as Fe, supported on a refractory oxide or zeolite. Suitable refractory oxides include $Al_2O_3$, $TiO_2$, $CeO_2$, $SiO_2$, $ZrO_2$ and mixed oxides containing two or more thereof. The non-zeolite catalyst can also include tungsten oxide, e.g. $V_2O_5/WO_3/TiO_2$.

Lean $NO_x$ catalysts, sometimes also called hydrocarbon-SCR catalysts, $DeNO_x$ catalysts or even non-selective catalytic reduction catalysts, include $Pt/Al_2O_3$, Cu- Pt-, Fe-, Co- or Ir-exchanged ZSM-5, protonated zeolites such as H-ZSM-5 or H—Y zeolites, perovskites and $Ag/Al_2O_3$. In selective catalytic reduction (SCR) by hydrocarbons (HC), HC react with NOx, rather than with $O_2$, to form nitrogen, $CO_2$ and water according to equation (6):

$$\{HC\} + NOx \rightarrow N_2 + CO_2 + H_2O \quad (6)$$

The competitive, non-selective reaction with oxygen is given by Equation (7):

$$\{HC\} + O_2 \rightarrow CO_2 + H_2O \quad (7)$$

Therefore, good HC-SCR catalysts are more selective for reaction (6) than reaction (7).

In particular embodiments, the washcoat comprises at least one zeolite, such as an aluminosilicate zeolite or a SAPO, for trapping positive ignition PM. The at least one zeolite can be a small, a medium or a large pore zeolite, for example. By "small pore zeolite" herein we mean zeolites containing a maximum ring size of 8, such as CHA; by "medium pore zeolite" herein we mean a zeolite containing a maximum ring size of 10, such as ZSM-5; and by "large pore zeolite" herein we mean a zeolite having a maximum ring size of 12, such as beta. Small pore zeolites are potentially advantageous for use in SCR catalysts—see for example WO 2008/132452, disclosing as preferred zeolites SAPO-34 or SSZ-13 having a CHA framework structure and Nu-3 having a LEV framework type.

Particular zeolites with application in the present invention are selected from the group consisting of AEI, ZSM-5, ZSM-20, ERI including ZSM-34, mordenite, ferrierite, BEA including Beta, Y, CHA, LEV including Nu-3, MCM-22 and EU-1.

In embodiments, the zeolites can be un-metallised or metallised with at least one metal selected from the group consisting of groups IB, IIB, IIIA, IIIB, VB, VIB, VIB and VIII of the periodic table. Where metallised, the metal can be selected from the group consisting of Cr, Co, Cu, Fe, Hf, La, Ce, In, V, Mn, Ni, Zn, Ga and the precious metals Ag, Au, Pt, Pd and Rh. Such metallised zeolites can be used in a process for selectively catalysing the reduction of nitrogen oxides in positive ignition exhaust gas using a reductant. By "metallised" herein we mean to include zeolites including one or more metals incorporated into a framework of the molecular sieve e.g. Fe in-framework Beta and Cu in-framework CHA. As mentioned above, where the reductant is a hydrocarbon, the process is sometimes called "hydrocarbon selective catalytic reduction (HC-SCR)", "lean $NO_x$ catalysis" or "DeNO$_x$ catalysis", and particular metals for this application include Cu, Pt, Mn, Fe, Co, Ni, Zn, Ag, Ce, Ga. Hydrocarbon reductant can either be introduced into exhaust gas by engine management techniques, e.g. late post injection or early post injection (so-called "after injection").

Where the reductant is a nitrogenous reductant (so-called "$NH_3$-SCR"), metals of particular interest are selected from the group consisting of Ce, Fe and Cu. Suitable nitrogenous reductants include ammonia. Ammonia can be generated in situ e.g. during rich regeneration of a NAC disposed upstream of the filter or by contacting a TWC with engine-derived rich exhaust gas (see the alternatives to reactions (4) and (5) hereinabove). Alternatively, the nitrogenous reductant or a precursor thereof can be injected directly into the exhaust gas. Suitable precursors include ammonium formate, urea and ammonium carbamate. Decomposition of the precursor to ammonia and other by-products can be by hydrothermal or catalytic hydrolysis.

The cell density of diesel wallflow filters in practical use can be different from wallflow filters for use in the present invention in that the cell density of diesel wallflow filters is generally 300 cells per square inch (cpsi) or less, e.g. 100 or 200 cpsi, so that the relatively larger diesel PM components can enter inlet channels of the filter without becoming impacted on the solid frontal area of the diesel particulate filter, thereby caking and fouling access to the open channels, whereas wallflow filters for use in the present invention can be up to 300 cpsi or greater, such as 350 cpsi, 400, cpsi, 600 cpsi, 900 cpsi or even 1200 cpsi.

An advantage of using higher cell densities is that the filter can have a reduced cross-section, e.g. diameter, than diesel particulate filters, which is a useful practical advantage that increases design options for locating exhaust systems on a vehicle.

According to a further aspect, the invention provides an exhaust system for a positive ignition or compression ignition engine, which system comprising a filter according to the invention. Positive ignition engines for use in this aspect of the invention can be fuelled by gasoline fuel, gasoline fuel blended with oxygenates including methanol and/or ethanol, liquid petroleum gas or compressed natural gas. Compression ignition engines for use in this aspect of the invention can be fuelled by diesel fuel, biodiesel fuel, blends of diesel and biodiesel fuels and compressed natural gas.

In one embodiment, the exhaust system comprises means for injecting a reductant fluid, e.g. a hydrocarbon or nitrogenous reductant or a precursor thereof, into exhaust gas upstream of the filter. In a particular embodiment, the reductant fluid is a nitrogenous compound.

In a particular embodiment, the injector and filter are both located downstream of a TWC.

In another aspect, embodiments of the invention provide a positive ignition engine comprising an exhaust system according to the invention and to a vehicle comprising such a positive ignition engine. In a preferred embodiment, the positive ignition engine is a direct injection positive ignition engine.

In another aspect, the invention provides a compression ignition engine comprising an exhaust system according to the invention.

In a further aspect, the invention provides a method of trapping particulate matter (PM) from exhaust gas emitted from a positive ignition engine by depth filtration, which method comprising contacting exhaust gas containing the PM with a filter comprising a porous substrate having inlet and outlet surfaces, wherein the inlet surfaces are separated from the outlet surfaces by a porous structure containing pores of a first mean pore size, wherein the porous substrate is coated with a washcoat comprising a plurality of solid particles wherein the porous structure of the washcoated porous substrate contains pores of a second mean pore size, and wherein the second mean pore size is less than the first mean pore size.

FIGS. 2A-C show a cross-section through a porous filter substrate 10 comprising a surface pore 12. FIG. 2A shows a first embodiment, featuring a porous surface washcoat layer 14 comprised of solid washcoat particles, the spaces between which particles define pores (interparticle pores). It can be seen that the washcoat layer 14 substantially covers the pore 12 of the porous structure and that a mean pore size of the interparticle pores 16 is less than the mean pore size 12 of the porous filter substrate 10.

FIG. 2B shows a second embodiment comprising a washcoat that is coated on an inlet surface 16 and additionally within a porous structure 12 of the porous substrate 10. It can be seen that the washcoat layer 14 causes a narrowing of a pore openings of surface pore 12, such that a mean pore size 18 of the coated porous substrate is less than the mean pore size 12 of the porous filter substrate 10.

FIG. 2C shows a third embodiment, wherein the washcoat 14 sits substantially within, i.e. permeates, the porous 12 structure of the porous substrate 10.

Figure 3:
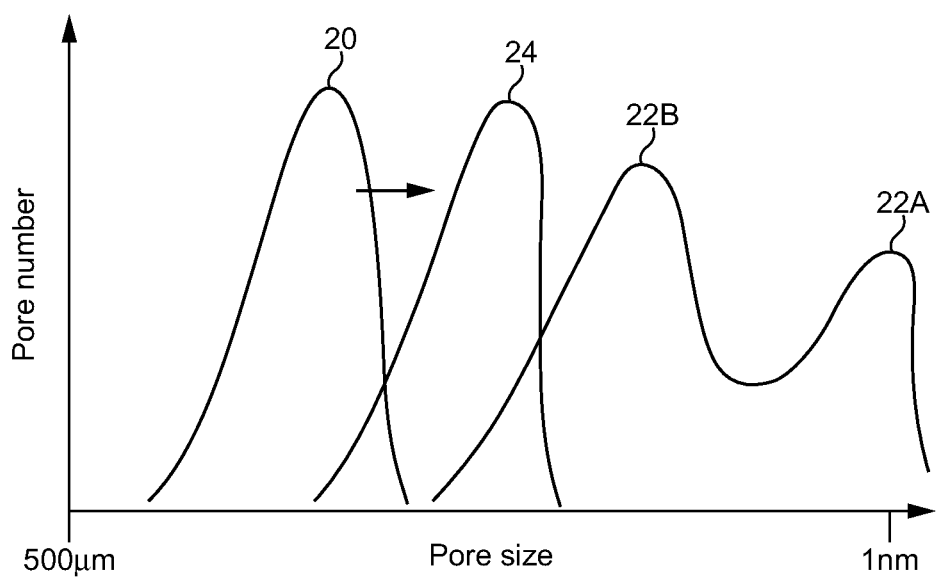
FIG. 3 is a schematic graph of mercury porosimetry relating the pore size distribution of a porous filter substrate, a porous washcoat layer and a porous filter substrate including a porous surface washcoat layer.

FIG. 3 shows an illustration of a graph relating pore size to pore number for a porous filter substrate 20, a porous washcoat layer 22 and a porous diesel filter substrate including a surface washcoat layer 24. It can be seen that the filter substrate has a mean pore size of the order of about 15 μm. The washcoat layer has a bimodal distribution comprised of intraparticle pores 22A (at the nanometer end of the range) and interparticle pores 22B towards the micrometer end of the scale. It can also be seen that by coating the porous filter substrate with a washcoat according to the invention that the pore distribution of the bare filter substrate is shifted in the direction of the interparticle washcoat pore size (see arrow).

FIG. 4 sets out a matrix showing preliminary results for a washcoat loading study for a three-way catalyst washcoat on three wallflow filters having different mean pore sizes. In conclusion, there is a band of acceptable backpressure and filtration starting with a combination of 13 μm mean pore size wallflow filter and relatively low washcoat loading (0.4 g in$^{-3}$) through the 20 μm and 13 μm pore size substrates having 0.8 g in$^{-3}$ to the 1.6 and 2.4 g in$^{-3}$ loadings on the 38 μm and 20 μm mean pore size substrates.

However, overlying this matrix for three-way catalyst use is that washcoat loadings of ≥1.6 g in$^{-3}$ are preferred for acceptable three-way catalyst activity in a stand-alone product. Embodiments of the invention allow a combination of sufficient three-way catalyst activity and PM filtration to be achieved without a significant increase in backpressure. Increased washcoat loadings on lower mean pore size wallflow filter substrates can only be used in applications that can tolerate increased backpressure. With reference to FIG. 4, whilst in certain applications where backpressure increases can be tolerated, a 13 μm mean pore size wallflow filter substrate can be used in combination with ≥1.6 g in$^{-3}$ washcoat loading, we presently prefer to use a mean pore size of ≥20 μm for ≥1.6 g in$^{-3}$ loadings to achieve a desirable balance between catalyst activity, filtration and backpressure. A benefit of the invention is that a state-of-the-art three-way catalyst comprising a flow-through monolith substrate that is typically located on a vehicle in either an underfloor or close-coupled location can be replaced with a filter according to the embodiments of the invention to provide sufficient three-way activity to meet legislative requirements for gaseous HC, CO and NOx emissions, while also meeting particle number standards as required by e.g. Euro 6 standards.

The filter according to the embodiments of the invention could obviously be used in combination with other exhaust system aftertreatment components to provide a full exhaust system aftertreatment apparatus, e.g. a low thermal mass TWC upstream of the filter and/or downstream catalytic elements, e.g. $NO_x$ trap or SCR catalyst, according to specific requirements. So, in vehicular positive ignition applications producing relatively cool on-drive cycle exhaust gas temperatures, we contemplate using a low thermal mass TWC disposed upstream of the filter according to embodiments of the invention. For vehicular lean-burn positive ignition applications, we envisage using a filter according to embodiments of the invention upstream or downstream of a $NO_x$ trap. In vehicular stoichiometrically-operated positive ignition engines, we believe that the filter according to the embodiments of the present invention can be used as a standalone catalytic exhaust system aftertreatment component. That is, in certain applications the filter according to the embodiments of the invention is adjacent to and in direct fluid communication with the engine without intervening catalysts therebetween; and/or an exit to atmosphere from an exhaust gas aftertreatment system is adjacent to and in direct fluid communication with the filter according to embodiments of the present invention without intervening catalysts therebetween.

An additional requirement of a TWC is a need to provide a diagnosis function for its useful life, so called "on-board diagnostics" or OBD. A problem in OBD arises where there is insufficient oxygen storage capacity in the TWC, because OBD processes for TWCs use remaining oxygen storage capacity to diagnose remaining catalyst function. However, if insufficient washcoat is loaded on the filter such as in the specific Examples disclosed in US 2009/0193796 and WO 2009/043390, there may not be enough OSC present to provide an accurate OSC "delta" for OBD purposes. Since embodiments of the present invention enable washcoat loadings approaching current state-of-the-art TWCs, the filters for use in such embodiments can be used with advantage in current OBD processes.

EXAMPLES

In order that the invention may be more fully understood the following Examples are provided by way of illustration only. The washcoat loadings quoted in the Examples were obtained using the method disclosed in WO 99/47260 described hereinabove by coating half of the washcoat from one end and the remaining half of the washcoat from the other end, i.e. the entire washcoat was not coated only on the inlet or outlet channels of the filter, but on both the inlet and outlet channels of the filter.

Example 1

Two three-way catalyst (TWC) coatings were prepared at a washcoat loading of 2.4 g/in³ and a precious metal loading of 85 g/ft³ (Pd:Rh 16:1); one was milled to a small particle size (d90<5 μm) that would be expected to pass into the pore structure of a wallflow filter ("in-wall"), while the other was less milled (d90<17 μm) so that it would be expected preferentially to locate more at the surface of a wallflow filter wall ("on-wall"). The coatings were applied to 4.66×4.5 inch 300 cells per square inch cordierite wallflow filter substrates having 12 thousandths of an inch wall thickness ("300/12") with a nominal average pore size of 20 micrometers (hereinafter "microns") (62% porosity). Each filter was hydrothermally oven-aged at 980° C. for 4 hours and installed in a close-coupled position on a Euro 5 passenger car with a 1.4 L direct injection gasoline engine. Each filter was evaluated over a minimum of three MVEG-B drive cycles, measuring the reduction in particle number emissions relative to a reference catalyst, wherein the filter was exchanged for a TWC coated onto a flowthrough substrate monolith at the same washcoat and precious metal loadings—and the backpressure differential was determined between sensors mounted upstream and downstream of the filter (or reference catalyst).

In Europe, since the year 2000 (Euro 3 emission standard) emissions are tested over the New European Driving Cycle (NEDC). This consists of four repeats of the previous ECE 15 driving cycle plus one Extra Urban Driving Cycle (EUDC) with no 40 second warm-up period before beginning emission sampling. This modified cold start test is also referred to as the "MVEG-B" drive cycle. All emissions are expressed in g/km.

The Euro 5/6 implementing legislation introduces a new PM mass emission measurement method developed by the UN/ECE Particulate Measurement Programme (PMP) which adjusts the PM mass emission limits to account for differences in results using old and the new methods. The Euro 5/6 legislation also introduces a particle number emission limit (PMP method), in addition to the mass-based limits.

The results in Table 1 demonstrate that the filters prepared with the larger particle size "on-wall" washcoat have significantly improved particle number reduction than the filters prepared with the smaller particle size "in-wall" washcoat, with a small, but acceptable, increase in peak backpressure.

TABLE 1

Effect of washcoat location within filter on particle number reduction and backpressure (BP)

| Sample filter properties | Washcoat type | % PN reduction vs. flow through reference | Average BP (mbar) on 70 kph cruise of MVEG-B drive cycle | Peak BP (mbar) during any one MVEG-B drive cycle |
|---|---|---|---|---|
| 20 μm, 62% | "In-wall" | 75 | 14.3 | 73.5 |
| 20 μm, 62% | "On-wall" | 83 | 16.2 | 104.2 |

Example 2

5.66×3 inch cordierite wallflow filter substrates with a cell density of 300 cells per square inch and a wall thickness of 12 thousandths of an inch (approximately 0.3 mm) were coated with a three-way catalyst (TWC) coating at a washcoat loading of 0.8 g/in³ and a palladium loading of 80 g/ft³. Three pore structures were compared: a nominal average pore size of 38 microns at 65% porosity, a nominal average pore size of 20 microns at 62% porosity and a nominal average pore size of 15 microns at 52% porosity. Each filter was hydrothermally oven-aged at 980° C. for 4 hours and installed in the underfloor position on a Euro 4 passenger car with a 1.4 L direct injection gasoline engine, with a fully formulated three-way catalyst coated on a flowthrough substrate monolith located in the close-coupled position, i.e. upstream of the filter. Each filter was evaluated over a minimum of three MVEG-B drive cycles, measuring the reduction in particle number emissions relative to a reference system, wherein the underfloor filter was exchanged for a TWC coated on a flowthrough substrate monolith at identical washcoat and palladium loadings and the backpressure differential was determined between sensors mounted upstream of the close-coupled TWC and downstream of the filter (or reference catalyst). The peak backpressure results given in Table 2 are the backpressure reading on the third repeat of the MVEG-B cycle.

The results in Table 2 demonstrate that the 38 micron filter had significantly lower levels of particle number removal (insufficient for this vehicle application), albeit with the lowest backpressure. The 20 micron filter gave acceptable levels of particle number reduction with a moderate increase in backpressure. The 15 micron filter was most effective at reducing particle number emissions but had significantly higher backpressure than the 20 micron filter embodiment.

TABLE 2

Comparison of particle number reduction and backpressure (BP) for different pore size filters

| Sample filter properties | % PN reduction vs. flow through reference | Average BP (mbar) on 70 kph cruise of third MVEG-B drive cycle | Peak BP (mbar) during third MVEG-B drive cycle |
|---|---|---|---|
| 38 μm, 65% | 18 | 7.5 | 52.5 |
| 20 μm, 62% | 85 | 12.1 | 68.9 |
| 15 μm, 52% | 92 | 18.8 | 97.5 |

Example 3

4.66×4.5 inch, 300/12 cordierite wallflow filter substrates with a nominal average pore size of 20 microns and porosity of 62% were coated with a three-way catalyst coating at washcoat loadings of 0.8, 1.6 and 2.4 g/in$^3$ respectively. Each sample had a precious metal loading of 85 g/ft$^3$ (Pd:Rh 16:1). Each filter was hydrothermally oven-aged at 980° C. for 4 hours and installed in a close-coupled position on a Euro 4 passenger car with a 1.4 L direct injection gasoline engine. Each filter was evaluated over a minimum of three MVEG-B drive cycles, measuring the reduction in particle number emissions relative to a reference catalyst, wherein the close-coupled filter was exchanged for a TWC coated on a flowthrough substrate monolith at an identical washcoat and precious metal loading, the backpressure differential and the conversion efficiency for gaseous HC, CO and NO$_x$ emissions were determined between sensors mounted upstream and downstream of the filter (or reference catalyst). Only non-methane hydrocarbons (NMHC) conversion is reported in Table 3 (the NMHC for Euro 6 is 68 mg/km within a total hydrocarbon emission limit of 100 mg/km).

The results in Table 3 demonstrate that the filter prepared with a washcoat loading of 0.8 g/in$^3$ had significantly lower levels of particle number removal and the lowest NMHC conversion efficiency. Such TWC performance would not be sufficient to meet Euro 6 gaseous emissions limits for a typical passenger car. Increasing the washcoat loading to 1.6 and 2.4 g/in$^3$ gave greater reductions in particle number emissions, albeit at increasing, but acceptable, backpressure. TWC activity (as represented in Table 3 by NMHC performance) was also significantly improved with the higher washcoat loadings.

TABLE 3

Comparison of particle number reduction, backpressure (BP) and TWC activity at different washcoat loadings

| Sample washcoat loading | % PN reduction vs. flow through reference | Average BP (mbar) on 70 kph cruise of MVEG-B drive cycle | Peak BP (mbar) during any one MVEG-B drive cycle | % of Euro 6 NMHC engineering target[†] |
|---|---|---|---|---|
| 0.8 | 53 | 7.7 | 51 | 110 |
| 1.6 | 63 | 10.1 | 65 | 88 |
| 2.4 | 67 | 18.7 | 100 | 81 |

[†]The "engineering target" is often used by the vehicle manufacturers and represents a percentage of the legislated emissions. For the purposes of these Examples, we have used an engineering target of 80%. Since the Euro 6 NMHC standard is 68 mg/km, the engineering target is 54 mg/km. The calculated percentage of this number is used to assess the reduction in NMHC results achieved over the MVEG-B drive cycle. This gives values above and below 100% that relate well to the acceptable three-way catalyst activity.

Example 4

4.66×4.5 inch, 300/12 cordierite wallflow filter substrates with a cell density of 300 cells per square inch and a wall thickness of approximately 0.3 mm were coated with a three-way catalyst coating at a washcoat loading of 1.6 g/in$^3$ and a precious metal loading of 85 g/ft$^3$ (Pd:Rh 16:1). Two pore structures were compared: a nominal average pore size of 38 microns at 65% porosity and a nominal average pore size of 20 microns at 62% porosity. A smaller pore sample was not evaluated because, from the results obtained from the Example 2, the backpressure was expected to be too great for the Euro 4 passenger car in this test. Each filter was hydrothermally oven aged at 980° C. for 4 hours and installed in a close-coupled position on a Euro 4 passenger car with a 1.4 L direct injection gasoline engine. Each filter was evaluated over a minimum of three MVEG-B drive cycles, measuring the reduction in particle number emissions relative to a reference catalyst, wherein the close-coupled filter was exchanged for a TWC coated on a flowthrough substrate monolith at an identical washcoat and precious metal loading, the backpressure differential and the conversion efficiency for gaseous HC, CO and NO$_x$ emissions were determined between sensors mounted upstream and downstream of the filter (or reference catalyst). Only non-methane hydrocarbons (NMHC) conversion is reported in Table 4.

The results in Table 4 demonstrate that the 38 micron filter had significantly lower levels of particle number removal (insufficient for this vehicle application) and lower backpressure, which may be acceptable in other vehicle applications. The 20 micron filter gave good levels of particle number reduction with a moderate increase in backpressure. Both samples had good TWC activity at a washcoat loading of 1.6 g/in$^3$.

TABLE 4

Comparison of particle number reduction, backpressure (BP) and TWC activity for different pore size filters

| Sample filter properties | % PN reduction vs. flow through reference | Average BP (mbar) on 70 kph cruise of MVEG-B drive cycle | Peak BP (mbar) during any one MVEG-B drive cycle | % of Euro 6 NMHC engineering target[†] |
|---|---|---|---|---|
| 38 μm, 65% | 34 | 5.9 | 43.4 | 88 |
| 20 μm, 62% | 63 | 10.1 | 65 | 88 |

[†]See footnote to Table 3.

Example 5

4.66×4.5 inch, 300/12 cordierite wallflow filter substrates with a cell density of 300 cells per square inch and a wall thickness of approximately 0.3 mm were coated with a three-way catalyst coating at a washcoat loading of 2.4 g/in$^3$ and a precious metal loading of 85 g/ft$^3$ (Pd:Rh 16:1). Two pore structures were compared: a nominal average pore size of 38 microns at 65% porosity and a nominal average pore size of 20 microns at 62% porosity. A smaller pore sample was not evaluated because, from the results obtained from the Example 2, the backpressure was expected to be too great for the Euro 5 passenger car in this test. Each filter was hydrothermally oven-aged at 980° C. for 4 hours and installed in a close-coupled position on a Euro 5 passenger car with a 1.4 L direct injection gasoline engine. The filters were evaluated over a minimum of three MVEG-B drive cycles, measuring the reduction in particle number emissions relative to a reference catalyst, wherein the close-coupled filter was exchanged for a TWC coated on a flowthrough substrate monolith at an identical washcoat and precious metal loading, the backpressure differential and the conversion efficiency for gaseous HC, CO and NO$_x$ emissions were determined between sensors mounted upstream and downstream of the filter (or reference catalyst). Only non-methane hydrocarbons (NMHC) conversion is reported in Table 5.

The results in Table 5 demonstrate that the 38 micron filter had significantly lower levels of particle number removal (borderline for this vehicle application) and lower backpressure than the 20 micron filter embodiment. The 20 micron filter gave good levels of particle number reduction with a moderate increase in backpressure. Both samples had good TWC activity at a washcoat loading of 2.4 g/in$^3$. Both samples displayed greater particle number reduction and increased backpressure compared to the 1.6 g/in$^3$ samples described in Example 4.

TABLE 5

Comparison of particle number reduction, backpressure (BP) and TWC activity for different pore size filters

| Sample filter properties | % PN reduction vs. flow through reference | Average BP (mbar) on 70 kph cruise of MVEG-B drive cycle | Peak BP (mbar) during any one MVEG-B drive cycle | % of Euro 6 NMHC engineering target† |
|---|---|---|---|---|
| 38 μm, 65% | 50 | 7.4 | 44.1 | 44 |
| 20 μm, 62% | 75 | 14.3 | 73.5 | 53 |

†See footnote to Table 3.

Example 6

118×60 mm, 360 cells per square inch cordierite wallflow filter substrates having 5 thousandths of an inch cell wall thickness (360/5) with a nominal average pore size of 13 microns and porosity of 48% were coated with a three-way catalyst coating at washcoat loadings of 0.4 and 0.8 g/in$^3$. Each sample had a precious metal loading of 85 g/ft$^3$ (Pd:Rh 16:1). Higher washcoat loadings were not evaluated because the resulting backpressure was expected to be too great for the Euro 4 passenger car in this test. A fresh (i.e. un-aged) filter was installed in a close-coupled position on a Euro 4 passenger car with a 1.4 L direct injection gasoline engine. Each filter was evaluated over a minimum of three MVEG-B drive cycles, measuring the reduction in particle number emissions relative to a reference catalyst, wherein the close-coupled filter was exchanged for a TWC coated on a flowthrough substrate monolith at an identical washcoat and precious metal loading and the backpressure differential and the conversion efficiency for gaseous HC, CO and NO$_x$ emissions were determined between sensors mounted upstream and downstream of the filter (or reference catalyst). Only non-methane hydrocarbons (NMHC) conversion is reported in Table 6.

The results in Table 6 demonstrate that the 13 micron filter prepared with a washcoat loading of 0.8 g/in$^3$ gave moderate levels of particle number removal (borderline for this vehicle application) but had extremely high backpressure. Reducing the washcoat loading to 0.4 g/in$^3$ gave more acceptable backpressure but a smaller reduction in particle number emissions. Such low washcoat levels would not be expected to give sufficient three-way catalyst activity to meet Euro 6 emission standards.

TABLE 6

Comparison of particle number reduction and backpressure (BP) at different washcoat loadings

| Sample washcoat loading | % PN reduction vs. flow through reference | Average BP (mbar) on 70 kph cruise of MVEG-B drive cycle | Peak BP (mbar) during any one MVEG-B drive cycle |
|---|---|---|---|
| 0.4 | 50 | 11.3 | 78.4 |
| 0.8 | 54 | 45.2 | 211.8 |

Example 7

A Euro 5 passenger car with a 2.0 L direct injection gasoline engine equipped with a fully formulated three-way catalyst coated on a flowthrough substrate monolith in the close-coupled position was tested over the MVEG-B and FTP (Federal Test Procedure) 75 drive cycles. The number of particles emitted over the MVEG-B drive cycle was measured according to the PMP methodology. The mass of particulate matter emitted over the FTP 75 drive cycle was measured following standard protocols. A 125×120 mm, 300/12 cordierite wallflow filter with a nominal average pore size of 12 microns and porosity of 55% coated with a three-way catalyst coating at a washcoat loading of 0.8 g/in$^3$ and a precious metal loading of 20 g/ft$^3$ (Pd:Rh 3:1) was then fitted in the underfloor position, i.e. downstream of the flowthrough substrate monolith. Particulate mass and number emissions measurements were repeated.

The results in Table 7 demonstrate that fitment of the additional coated filter reduced particle number emissions over the MVEG-B cycle by ~99% and reduced the particulate mass emitted over the FTP 75 cycle by ~75% relative to the flowthrough TWC-only system. Depending what CARB PM emission standard is adopted, the 2.7 mg PM/mile figure could fail that standard.

TABLE 7

Effect of filter fitment on particulate number and mass emissions

| Catalyst system | PN emissions over MVEG-B drive cycle (#/km) | PM emissions over FTP 75 drive cycle (mg/ml) |
|---|---|---|
| Flowthrough TWC only | 4.42 × 10$^{12}$ | 2.7 |
| Flowthrough TWC + Coated filter | 4.69 × 10$^{10}$ | 0.6 |

The following Examples 8-10 are provided by way of illustration only for embodiments of the invention for use with compression ignition engines. In these Examples, the Soot Loading Back Pressure ("SLBP") test uses the apparatus and method described in EP 1850068, i.e.:

(i) an apparatus for generating and collecting particulate matter derived from combusting a liquid carbon-containing fuel, which apparatus comprising a fuel burner comprising a nozzle, which nozzle is housed in a container, which container comprising a gas inlet and a gas outlet, said gas outlet connecting with a conduit for transporting gas from the gas outlet to atmosphere, means for detecting a rate of gas flowing through the gas inlet and means for forcing an oxidising gas to flow from the gas inlet via the container, the gas outlet and the conduit to atmosphere, a station for collecting particulate matter from gas flowing through the conduit and means for controlling the gas flow-forcing means in response to a detected gas flow rate at the gas inlet, whereby the rate of gas flow at the gas inlet is maintained at a desired rate to provide substoichiometric fuel combustion within the container, thereby to promote particulate matter formation; and (ii) a method of generating and collecting particulate matter derived from combusting liquid carbon-containing fuel in an oxidising gas, which method comprising burning the fuel in a substoichiometric quantity of oxidising gas in a fuel burner, said fuel burner comprising a nozzle, which nozzle being housed in a container, forcing an oxidising gas to flow from a gas inlet to the container to atmosphere via a gas outlet to the container and a conduit connected to the gas outlet, collecting particulate matter at a station located within the conduit, detecting a rate of oxidising gas flow at the gas inlet and controlling the rate of oxidising gas flow so that a desired rate of oxidising gas flow is maintained at the gas inlet.

The filter is inserted in the station for collecting particulate matter from gas flowing through the conduit. The fresh filter is first pre-conditioned at an air flow rate 80 kg/hr in a lean burn combustion stream using low sulphur diesel fuel (10 ppm S) to raise the filter inlet temperature to 650° C., a temperature that is typically used on a vehicle to regenerate a soot-loaded filter. This pre-conditioning step temperature is well above the soot combustion temperature and is to ensure that the filter on test is clean at the outset. Pressure sensors disposed upstream and downstream of the station monitor the backpressure across the filter. The backpressure against time is plotted in the accompanying FIGS. 5-7. The SLBP test is carried out at a filter inlet temperature of 250° C. at air flow rate of 180 kg/hour combusting low sulphur diesel fuel (10 ppm S).

Example 8

CSF and SCR Catalyst Coated Filter Backpressure Comparison

Three commercially available uncoated 5.66 inch×6 inch SiC wallflow filters having 60% porosity and a mean pore size of 20-25 μm were each coated, separately, with a catalyst washcoat for a catalysed soot filter (C S F) comprising precious metal supported on an alumina-based metal oxide and an Cu/Beta zeolite selective catalytic reduction (SCR) catalyst coating. The CSF coating was obtained according to the method disclosed in WO 99/47260, i.e. a method of coating a monolithic support, comprising the steps of (a) locating a containment means on top of a support, (b) dosing a predetermined quantity of a liquid component into said containment means, either in the order (a) then (b) or (b) then (a), and (c) by applying pressure or vacuum, drawing said liquid component into at least a portion of the support, and retaining substantially all of said quantity within the support. The coated product was dried and calcined and then the process steps were repeated from another end of the wallflow filter. The SCR coated filter was obtained by dip coating followed by draining, the application of a low vacuum to remove excess washcoat before drying and calcining. This method produces a surface coating (as determined by scanning electron microscope (SEM)) and in this respect distinguishes the coated filter wherein the SCR catalyst "permeates" the filter walls, as disclosed in EP 1663458. Two different CSF washcoat loadings were obtained, at 0.6 g/in$^3$ and 1.2 g/in$^3$. The SCR coated filter was washcoated at a loading of at 1.1 g/in$^3$.

Figure 5:
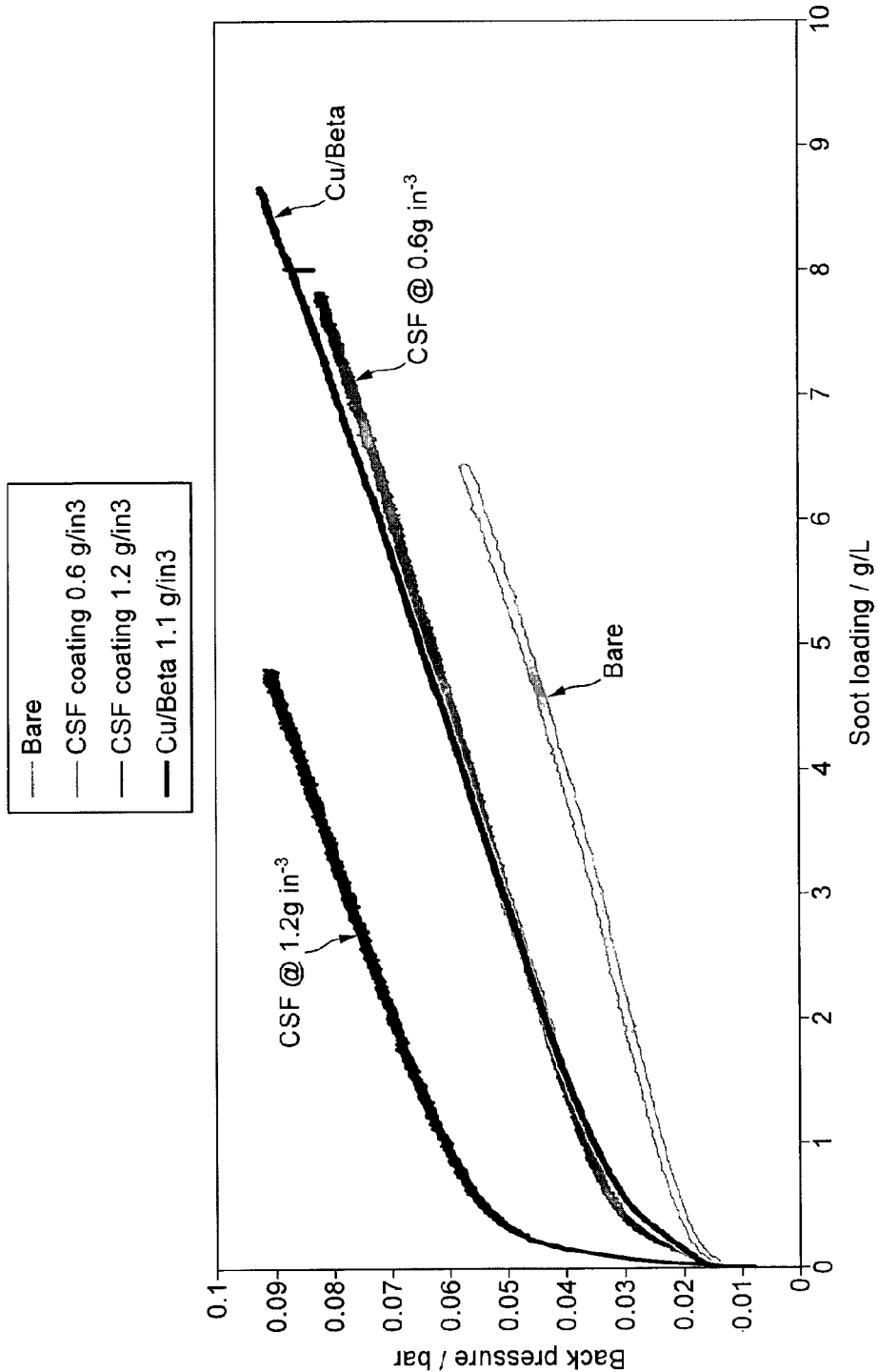
FIG. 5 is a graph showing the results of a Soot Loading Back Pressure study comparing backpressure against soot loading for 5.66 inch×6 inch SiC wallflow filters coated with two different oxidation catalyst washcoat loadings (g/in$^3$) and a bare filter (all not according to the invention) with a Fe/beta zeolite selective catalytic reduction (SCR) catalyst (according to the invention) at a comparable washcoat loading.

The three coated filters were tested using the SLBP test, a fourth, uncoated filter was used as a control. The results are shown in FIG. 5, from which it can be seen that the CSF coating at approximately the same washcoat loading has considerably higher backpressure compared to the SCR coated filter. We conclude, therefore, that there is an inherent coating porosity difference between CSF and SCR coated filter.

Example 9

SCR Catalyst Coated Filter Backpressure Comparison

Identical commercially available 5.66 inch×7.5 inch SiC wallflow filters having 60% porosity and a mean pore size of 20-25 μm were washcoated to a loading of 1.1 g/in$^3$ with Cu/SSZ-13 zeolite and Cu/Beta zeolite SCR catalysts, each catalyst having the same particle size D90 (90% of particles in washcoat having a particle size) at between 4.8-5 μm but apart from the transition metal/zeolite were in all other respects were substantially identical. The method of manufacture was to dip coat the part followed by draining, the application of a low vacuum to remove excess washcoat and then drying and calcining. A SLBP test was done to compare the finished parts.

Figure 6:
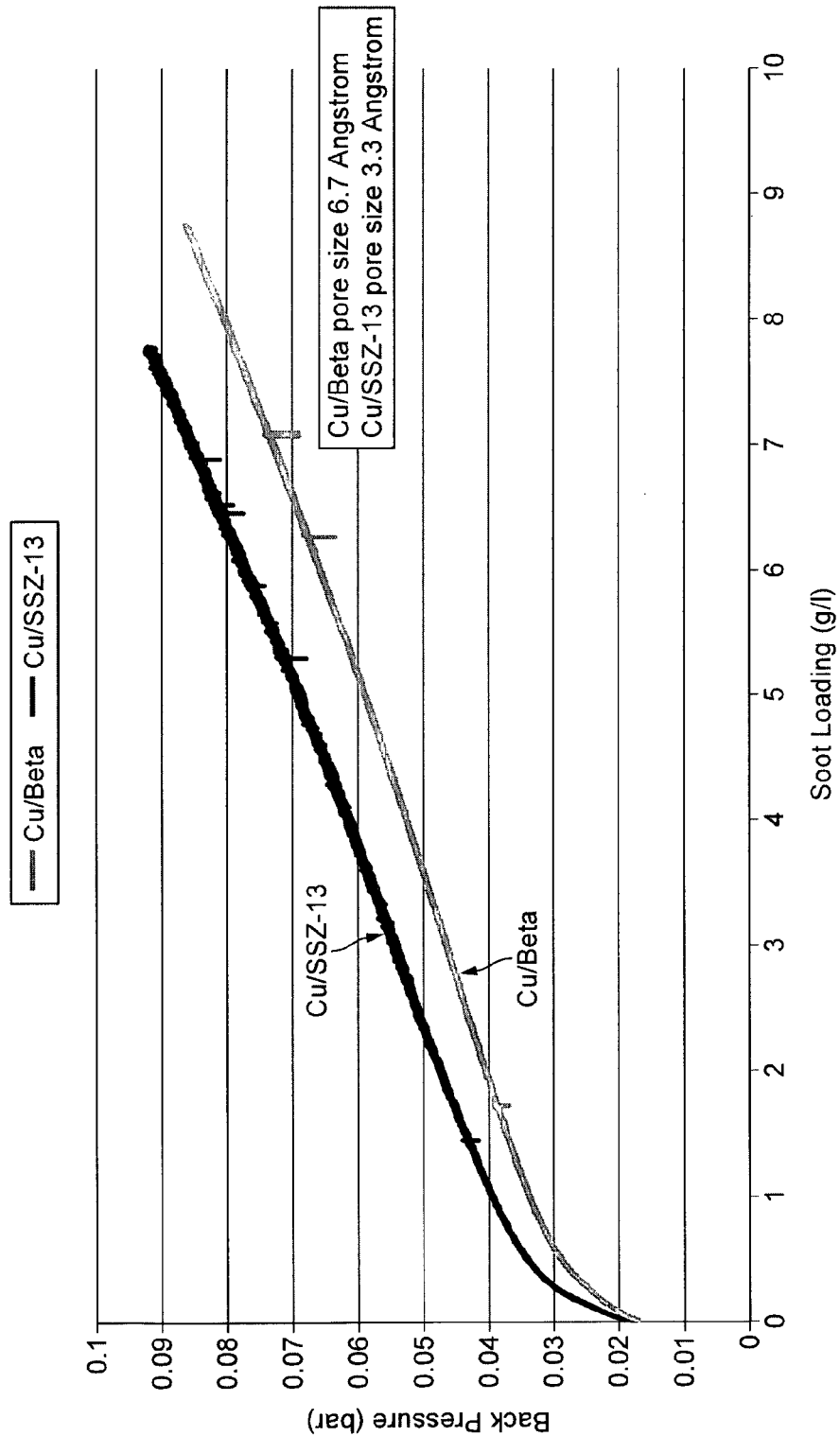
FIG. 6 is a graph comparing the backpressure in the same Soot Loading Back Pressure test for a Cu/SSZ-13 zeolite (a small pore zeolite) catalyst and a Fe/Beta zeolite (a large pore zeolite) SCR catalyst.

The results are presented in FIG. 6, from which it can be seen that the filter coated with the Cu/Beta zeolite catalyst has a lower rate of backpressure increase than the filter coated with the Cu/SSZ-13 zeolite catalyst. Since the fundamental difference between the two SCR catalysts is that the pore size of the SSZ-13 zeolite is 3.8×3.8 Angstroms and 5.6-7.7 Angstroms for the Beta zeolite (source: Structure Commission of the International Zeolite Association), we conclude that it is possible to adjust backpressure in the exhaust system, thereby increasing design options, by selecting a molecular sieve-based SCR catalyst having an appropriate pore size to achieve the desired backpressure objective and at the same time meeting emission standards for $NO_x$.

Example 10

Vehicle Testing

A 3.0 liter capacity SiC filter at 58% porosity and 23 μm nominal mean pore size Cu/Beta zeolite SCR catalyst coated filter manufactured by the dip coating method described in Example 8 was inserted into an exhaust system of a 2.0 liter Euro 5 compliant light duty diesel vehicle behind a standard diesel oxidation catalyst. The vehicle containing the fresh (i.e. un-aged) catalysed filter was then driven over the MVEG-B drive cycle, then the EUDC part of the MVEG-B cycle three times consecutively to pre-condition the filter.

In Europe, since the year 2000 (Euro 3 emission standard) emissions are tested over the New European Driving Cycle (NEDC). This consists of four repeats of the previous ECE 15 driving cycle plus one Extra Urban Driving Cycle (EUDC) with no 40 second warm-up period before beginning emission sampling. This modified cold start test is also referred to as the "MVEG-B" drive cycle. All emissions are expressed in g/km.

The Euro 5/6 implementing legislation introduces a new PM mass emission measurement method developed by the UN/ECE Particulate Measurement Programme (PMP) which adjusts the PM mass emission limits to account for differences in results using old and the new methods. The Euro 5/6 legislation also introduces a particle number emission limit (PMP method), in addition to the mass-based limits. The new Euro 5/6 particle number emission limit of $6 \times 10^{11}$ km$^{-1}$ using the PMP protocol allows for pre-conditioning of the system prior testing the system to determine whether it meets the emission standard over the MVEG-B drive cycle.

Figure 7:
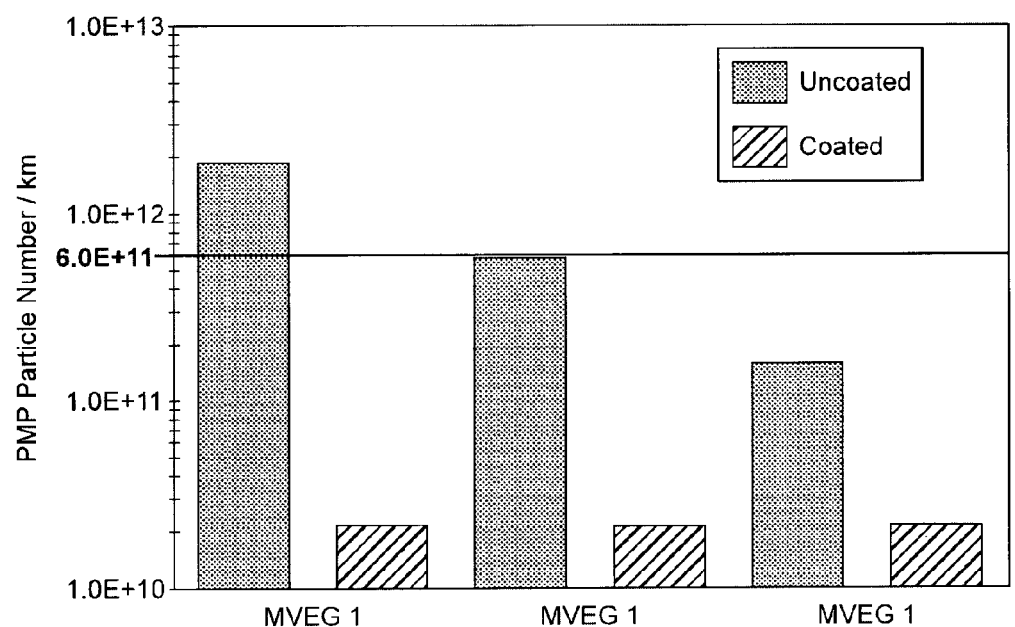
FIG. 7 is a bar chart comparing the particulate number emissions (particulate number per kilometer) from a 2.0 liter Euro 5 compliant light duty diesel vehicle fitted with standard diesel oxidation catalyst followed by a 3.0 liter SiC filter at 23 μm nominal mean pore size coated with a Fe/Beta zeolite SCR catalyst for meeting the Euro 5/6 particle number emission limit of 6×10$^{11}$ km$^{-1}$ (UN/ECE Particulate Measurement Programme (PMP)) with the same system containing a bare filter.

Repeated cold MVEG-B cycles were then run using the pre-conditioned system. The coated filter was exchanged in the system for an uncoated filter as a control. The results are shown as a bar chart in FIG. 7 comparing the particulate number emissions (particulate number per kilometer) from which it can be seen that despite pre-conditioning, which would be expected to develop a soot cake providing improved filtration, the uncoated filter initially failed the particle number emission limit of $6 \times 10^{-11}$ km$^{-1}$, but with repeated drive cycles the particle number came down consistently to within the emission standard. By contrast it can be seen that the coated filter is well within the emission standard from the first drive cycle following pre-conditioning. We interpret these data to mean that the coated filter promotes soot caking that improves diesel particulate filtration and therefore a more immediate reduction in particle number, yet—as is seen in Example 9—the Cu/Beta zeolite coated filter provides a lower backpressure compared with the Cu/SSZ-13 zeolite SCR catalyst or a CSF coating at a similar washcoat loading (see Example 8). Accordingly, the surface Cu/Beta SCR catalyst coating takes away the requirement to have a soot layer on a higher porosity/mean pore size filter before filtration occurs. Accordingly, the invention provides benefits for particle number reduction in "real world" driving conditions, as opposed to the idealised drive cycle conditions set for meeting emission standards.

For the avoidance of any doubt, the entire contents of all prior art documents cited herein is incorporated herein by reference.

The invention claimed is:

1. A system for filtering particulate matter from exhaust gas, said system comprising:
   a porous structure having substrate pores of a first mean pore size; a selective catalytic reduction (SCR) washcoat disposed within the porous structure to define pores of a second mean pore size; and the second mean pore size is less than the first mean pore size; and
   wherein said washcoat comprises a small pore zeolite promoted with at least one metal selected from the group consisting of Cr, Co, Cu, Fe, Hf, La, Ce, In, V, Mn, Ni, Zn, Ga, Ag, Au, Pt, Pd, and Rh.

2. The system according to claim 1, wherein the washcoat is further disposed on a surface of the porous structure.

3. The system according to claim 1, wherein the transition metal is selected from the group consisting of Cu, Fe, and Ce.

4. The system according to claim 1, wherein the zeolite has a CHA framework structure.

5. The system according to claim 4, wherein the transition metal consists of Cu.

6. The system according to claim 1, wherein the porous structure is a ceramic wallflow filter.

7. The system according to claim 1, wherein: the washcoat is present on the inlet surfaces; and the NO$_x$ absorber catalyst is disposed upstream of the porous structure.

8. The system according to claim 1, wherein the first mean pore size is from about 8 to 25 microns.

9. The system according to claim 1, wherein the washcoat has a mean particle size of 0.1-20 microns.

10. The system according to claim 1, wherein the washcoat has a D90 particle size of 0.1-20 microns.

11. The system according to claim 2 wherein the washcoat disposed on the surface of the porous structure has an average void ratio of 5-80% and an average void diameter of 0.2 to 500 microns.

* * * * *